(12) United States Patent
Fishman et al.

(10) Patent No.: US 7,061,657 B1
(45) Date of Patent: Jun. 13, 2006

(54) MULTICHANNEL OPTICAL COMMUNICATION SYSTEM AND METHOD UTILIZING WAVELENGTH AND COHERENCE DIVISION MULTIPLEXING

(75) Inventors: Ilya M. Fishman, Palo Alto, CA (US); Yu Sheng Bai, Redwood City, CA (US); Anat Z. Sneh, Mountain View, CA (US); Yuri A. Zakharenkov, Santa Clara, CA (US); Gregory S. Maurer, San Ramon, CA (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 09/416,081

(22) Filed: Oct. 12, 1999

(51) Int. Cl.
H04J 14/02 (2006.01)
H04J 14/08 (2006.01)
H04B 10/00 (2006.01)
H04B 10/04 (2006.01)

(52) U.S. Cl. .................. 359/124; 359/127; 359/154; 359/136; 359/183

(58) Field of Classification Search ............. 359/124, 359/127, 180, 154, 18
See application file for complete search history.

(56) References Cited

U.S. PATENT DOCUMENTS

| | | | |
|---|---|---|---|
| 4,959,826 A | * | 9/1990 | Smith .................. 370/1 |
| 5,144,467 A | * | 9/1992 | Kitajima et al. .......... 359/124 |
| 5,663,639 A | * | 9/1997 | Brown et al. ............ 324/96 |
| 5,703,708 A | * | 12/1997 | Das et al. ............... 359/140 |
| 5,861,965 A | * | 1/1999 | Koren et al. ............ 359/123 |
| 5,896,211 A | * | 4/1999 | Watanabe ............... 359/124 |
| 5,917,970 A | * | 6/1999 | Burns et al. ............ 385/24 |
| 6,185,345 B1 | * | 2/2001 | Singh .................... 385/24 |

OTHER PUBLICATIONS

Takara, H, Kawanishi et al. 100 Gbit/s optical waveform measurement with 0.6 ps resolution optical sampling using subpicosecond supercontinuum pulses, Electronics Letters, Jul. 7th, 1994, vol. 30 No: 14.*

* cited by examiner

*Primary Examiner*—Leslie Pascal
*Assistant Examiner*—M. R. Sedighian
(74) *Attorney, Agent, or Firm*—Arter & Hadden LLP (57) ABSTRACT

Method and system thereof for transmission of several coherence division multiplexed (CDM) optical signals via one wavelength division multiplexed (WDM) transmission channel of a multichannel WDM telecommunication system to extend the network capacity to a theoretical limit. A broadband optical source generates light within the spectral range of at least one WDM transmission channel. Several CDM channels share this spectral range to transmit and detect phase modulated optical signals through optical fiber links.

6 Claims, 6 Drawing Sheets

MULTICHANNEL OPTICAL COMMUNICATION SYSTEM AND METHOD UTILIZING WAVELENGTH AND COHERENCE DIVISION MULTIPLEXING

FIELD OF THE INVENTION

The present invention relates to transmission of optical signals over an optical fiber and, more particularly, to an optical communication method and system for transmitting several coherence division multiplexed (CDM) optical signals within one channel of wavelength division multiplexed (WDM) system to extend network capacity.

BACKGROUND OF THE INVENTION

Conventional optical fiber communications systems employ optical fibers to transport information in optical telecommunication networks. An electrical signal carrying information is used to modulate the light emitted by an optical source, typically a laser diode. The modulated light is then propagated through an optical fiber link comprising, in modern systems, at least one erbium-doped fiber amplifier (EDFA) and, in some systems, dispersion compensation modules (DCM). The light emerging from the optical fiber link illuminates an optical detector converting the information encoded on the optical signal back into an electrical signal. In early development stages of optical communication systems, the only way to increase the bit rate was to increase the modulation speed of the laser. In the later evolution of multichannel fiber transmission systems, two distinct methods of multiplexing data have been introduced: wavelength division multiplexing (WDM) and coherence division multiplexing (CDM).

Currently, WDM communication systems are the only multichannel optical systems deployed commercially. To increase the optical fiber capacity, WDM communication systems employ multiple lasers and wavelength-selective passive components to multiplex and demultiplex a plurality of distinct optical channels onto a single fiber. A plurality of laser sources, each modulated by a single information channel, have distinct frequencies lying on an internationally agreed frequency grid, and are typically separated by 50, 100 or 200 GHz within the transparency range of the optical fiber.

A traditional WDM communication system comprises a plurality of WDM transmitters, a wavelength division multiplexer and a wavelength division demultiplexer interconnected by an optical link, and a plurality of WDM optical receivers.

Each WDM transmitter operating at a specified distinct wavelength is capable of accepting an electrical input carrying an information channel. If the information channel is coded in an optical domain, then the optical signals have to be converted into an electrical domain by plurality of transponders to drive WDM transmitters. The number of individual information channels in modern WDM communication systems varies from 8 to 128.

A conventional optical link comprises one or more spans. Each span customarily comprises at least one optical amplifier (EDFA), a segment of optical fiber, and, optionally, a dispersion compensation module (DCM). The number of spans depends on the WDM system design and length of the transmission line. For a conventional long haul link, each span has a length of between 80 and 120 km. The maximum length of a link, which is determined by the requirement to regenerate the optical signal, is typically about 600 km. The multiplexed optical signal transmitted via the optical link is routed to the wavelength division demultiplexer for demultiplexing back into individual channels. In each individual channel, the optical signal is received and detected by a respective WDM receiver. A number of WDM receivers corresponds to the number of WDM transmitters. Each WDM optical receiver detects the respective optical signal and processes it to provide recovered clock and data for the subsequent system electronics.

WDM communication systems though significantly enhancing capacity of communication networks have certain technical limitations. To add more WDM channels to the system, one has to broaden the optical bandwidth determined by the spectral band of the optical amplifier, or reduce spacing between the adjacent channels. Broadening the spectral band of the optical amplifier requires new types of amplifiers operating in a wider band than conventional EDFAs. To reduce spacing between WDM channels, new WDM transmitters, multiplexers and demultiplexers should be used with narrower transmission band and tight performance specifications which are not commercially available at this time. In multichannel WDM systems, a substantial inventory of spare parts is required with specific optical characteristics, such as WDM transmitter wavelength. Beyond these technological difficulties, there are principal limitations, such as nonlinear effects and optical dispersion. Nonlinear effects in the optical link, particularly four-wave mixing, cause channel cross-talk and lead to significant performance degradation for the overall system. The effect of four-wave mixing is intensified as the number of equally spaced (in frequency) channels increases and (or) as the power per channel increases. Non-zero fiber dispersion is vital for minimization of nonlinear effects. In some types of the optical fiber, such as Dispersion Shifted Fiber (DSF) having low dispersion in the range of 1550 nm, multichannel WDM transmission is not feasible.

Another approach to extend the WDM system capacity is to introduce additional coding in time domain [T. W. Mossberg et. al., "Lightwave CDMA as a New Enabler of Optimal WDM System Design", Proc. NFOEC, v.2, p. 369, 1999]. This method allows to insert several information channels into one WDM channel but requires propagation of laser pulses much shorter than the inverse bit rate through the optical fiber.

The CDM approach to capacity enhancement is based on phase modulation of partially coherent light. The CDM method allows to encode, multiplex, transmit and decode several information channels sharing the same optical bandwidth. In CDM communication systems, the encoding and decoding is typically performed using path-length-mismatched Mach-Zehnder interferometers. The number of channels, each having a unique time delay and sharing the same optical bandwidth, is limited by channel bit rate and tolerated cross-talk between the channels.

The CDM systems having certain advantages compared to the WDM systems also have limitations that undermine their practical implementation. The CDM approach does not require strict control of the source optical frequency, as in WDM. However, the CDM communication system performance is defined by spectral shape of the source, path length mismatch accuracy, and the alleviation of environmentally induced phase deviations. In CDM systems, optical signal-to-noise ratio is degraded due to large noise introduced by mutually incoherent optical sources. The performance of CDM systems suffer from significant power budget penalties due to splitting and recombining of the optical power [R. H. Wentworth, "Optical Noise in Interferometric Systems Containing Strongly Unbalanced Paths", Ph.D. Thesis, Stanford University, 1988], and references therein.

SUMMARY OF THE INVENTION

In the present invention, the system and method employing both wavelength and coherence division multiplexing address the limitations of the existing WDM technology. The invention utilizes the benefits of existing WDM systems and enhances their capacity to a theoretical limit. It is a principal advantage of the present invention that impairments of WDM and disadvantages of CDM communication systems are substantially diminished or eliminated by loading one or more WDM transmission channels with a plurality of CDM transmission channels, and using an optical spectral range of one WDM channel for transmitting multiple CDM channels.

It is yet another significant advantage of the method and system of the present invention that the overall count of transmission channels is substantially increased, and the number of CDM channels added or dropped can be varied without changing the WDM physical infrastructure.

It is still another important advantage of the present invention that it utilizes a specially designed broadband optical source characterized by substantial noise reduction compared to the conventional broadband source used in the conventional CDM communication systems.

The invention provides a multichannel optical communication system for transmitting optical signals via an optical fiber. The system comprises a plurality of individual WDM transmission channels. A desired number of individual WDM transmission channels of this plurality is selected for transmission of WDM optical signals. Each WDM optical signal is transmitted via respective WDM transmission channel on a unique wavelength within a designated bandwidth. At least one WDM channel is assigned to transmit CDM optical signals. For CDM transmission, a CDM transmission unit is disposed within this at least one WDM transmission channel. The CDM transmission unit comprises one or more CDM transmission channels for transmitting CDM optical signals within the designated bandwidth of assigned at least one individual WDM transmission channel.

A broadband optical source significantly different from conventional broadband sources is used for transmitting CDM optical signals within one WDM transmission channel. According to one embodiment of the present invention a broadband optical source having continuous spectrum within one WDM channel comprises a semiconductor optical amplifier (SOA) for reducing relative intensity noise (RIN) originated from beating between different frequency components of this spectrum. According to another embodiment of the present invention a broadband optical source with reduced RIN has a discrete spectrum with equally spaced individual spectral lines wherein spacing between the spectral lines exceeds an electrical detection bandwidth of transmitted CDM optical signals.

According to the preferred embodiment of CDM transmission unit, the output of the broadband source is split into a reference path and a plurality of paths designated for one or more CDM transmission channels. In each CDM path, light is phase modulated and delayed by several coherence times relative to the reference path and to other CDM paths. The optical outputs of all delay lines are multiplexed by a CDM muliplexer and transmitted through an assigned WDM channel along the optical fiber link. On the receiving end of the link, the WDM demultiplexing occurs into initial number of WDM transmission channels and one or more CDM transmission channels. A plurality of WDM receivers receive and detect optical outputs from corresponding number of said WDM transmission channels and one or more CDM receivers receive and detect optical outputs from corresponding one or more said CDM transmission channels.

According to one embodiment of CDM receiver compatible with the broadband source of continuous spectrum, optical filters are inserted in each CDM transmission channel for reducing the phase noise component of said broadband source.

According to another embodiment of CDM receiver compatible with the broadband source with discrete spectral lines, a differential detector is used in each CDM transmission channel for reducing the DC component of said broadband source.

The invention provides a method of multichannel optical transmission via optical fiber. According to the method, a plurality of individual WDM transmission channels is provided. A requested number of individual WDM transmission channels are selected for transmitting WDM optical signals. At least one WDM transmission channel is selected for transmitting CDM optical signal within a designated range of wavelengths assigned to this channel. A light beam is generated by a broadband source within the spectral range of this WDM transmission channel. This beam is split into a plurality of optical paths, one path chosen as a reference path, and other paths assigned to CDM transmission channels. In each CDM channel, the light beam is phase modulated and delayed by several coherence times relative to the reference path and other CDM channels. At the output of the optical link WDM and CDM channels are demultiplexed, and information channels detected.

The advantages of the present invention will be set forth in the description which follows, or may be learned by practice of the present invention.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given bellow, serve to explain the principles of the present invention.

DETAILED DESCRIPTION OF THE PREFERRED EMBODIMENT

Figure 1:
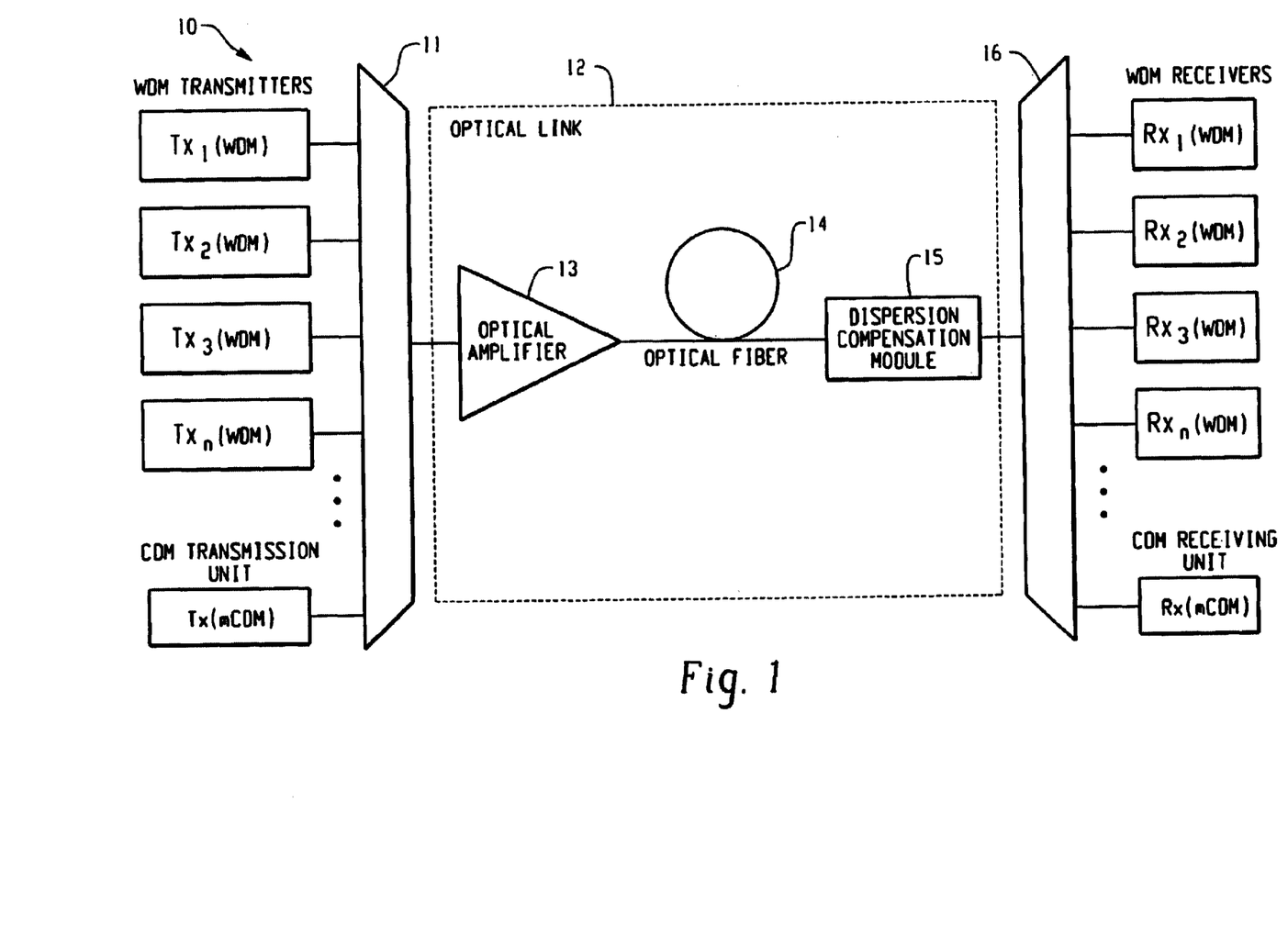
FIG. 1 is a block diagram of a multichannel communication system of the present invention.

The general overview of the optical communication system of the present invention is illustrated in FIG. 1 and is labeled by the reference numeral 10. The optical communication system 10 comprises a plurality of WDM transmitters $Tx_n$(WDM), and at least one CDM transmission unit Tx(mCDM), wherein n is a number of WDM transmission channels, m is a number of CMD transmission channels. Each WDM transmitter has a single transmission channel, while CDM transmission unit incorporates one or more transmission channels. Each WDM transmitter transmits the optical signal on a designated unique wavelength through an individual WDM transmission channel assigned to the designated range of wavelengths. Each CDM transmission unit transmits, within the range of wavelengths assigned to the individual WDM transmission channel, one or several CDM transmission channels.

The outputs of individual CDM transmission channels are multiplexed by CDM multiplexer (not shown) into an output of CDM transmission unit. The outputs of WDM transmitters and CDM transmission unit are multiplexed by a WDM multiplexer 11. The output of WDM multiplexer 11 is fed into an optical link 12. The optical link 12 may comprise several sub links. Each sub link conventionally comprises an EDFA 13, a segment of optical fiber 14, and a dispersion compensation module (DCM) 15. The number of sub links typically ranges between 5 and 7 but may vary depending on the application. The output of the optical link 12 is then demultipexed by WDM demultiplexer 16 into n+1 WDM optical channels, n WDM channels are fed to a plurality of WDM receivers $Rx_n$(WDM), and at least one WDM channel is fed to at least one CDM receiving unit Rx(mCDM) where it is further split by splitter (not shown) into m CDM transmission channels. A number of WDM receivers corresponds to the number of WDM transmitters as well as a number of CDM receiving units corresponds to the number of CDM transmitting units.

Figure 2:
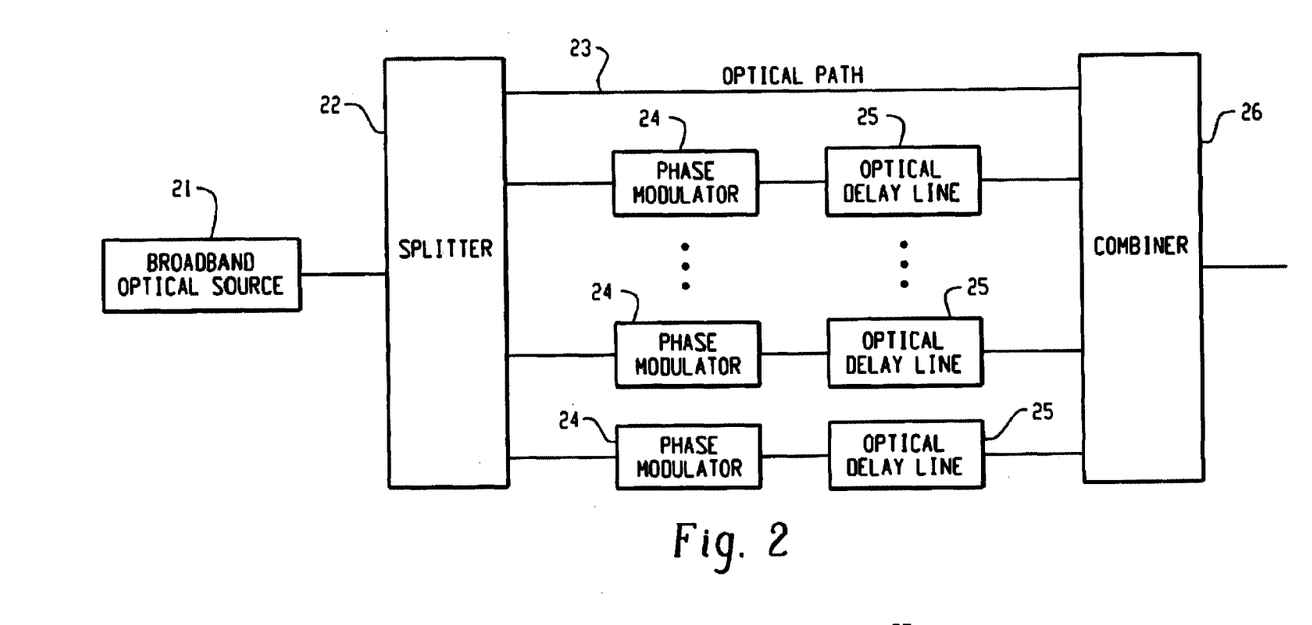
FIG. 2 is a block diagram of the CDM transmission unit of the multichannel communication system of the present invention.

A detailed block diagram of CDM transmission unit is shown in FIG. 2. Referring to FIG. 2, the CDM transmission unit comprises a broadband optical source 21 that generates light in a range of wavelengths designated for m CDM transmission channels. The light is directed to a splitter 22. Splitter 22 splits the light into M+1 optical paths, where M equals the number m of CDM transmission channels. The outstanding optical path is a reference path labeled by the reference numeral 23. Each of M optical paths comprises a phase modulator 24 and an optical delay line 25. Compared to the modulator with individual reference arms [R. H. Wentworth, "Optical Noise in Interferometric Systems Containing Strongly Unbalanced Paths", Ph.D. Thesis, Stanford University, 1988], the modulator with the common reference arm provides for maximum signal visibility in m-channel unit $$\left(\frac{1}{2\sqrt{m}} \text{ vs. } \frac{1}{m+1}\right)$$

obtainable with independent interferometers), and significantly simplifies the design of a CDM transmission unit. In each of the M optical paths, the optical delay line is designed to minimize crosstalk between CDM channels. Optimum time delays are chosen according to the relations: $t_1=mkt_c$, $t_2=(m+1)kt_c \ldots, t_M=(2m-1)kt_c$, where $t_c$=coherence time of the broadband source, k=numerical factor depending on the optical source spectral shape and acceptable crosstalk level. For crosstalk of −30 dB and a Gaussian shape of the source spectrum, k=2.7.

In the preferred embodiment, the CDM modulators 24 and the common reference arm 23 are integrated on a single lithium niobate chip. As an alternative, phase modulators may be discrete packaged devices. As another alternative, each phase modulator may utilize an independent reference arm integrated into a discrete package.

Splitter 22 and combiner 26 may be integrated using standard fiber couplers, planar waveguide devices, bulk or micro-optical components. The planar waveguide devices may be fabricated in lithium niobate, silica on silicon, or polymeric materials.

Optical delay lines 25 may be fabricated in waveguide planar technology or optical fibers of different length connecting splitter 22, combiner 26 and phase modulators 24.

Figure 7:
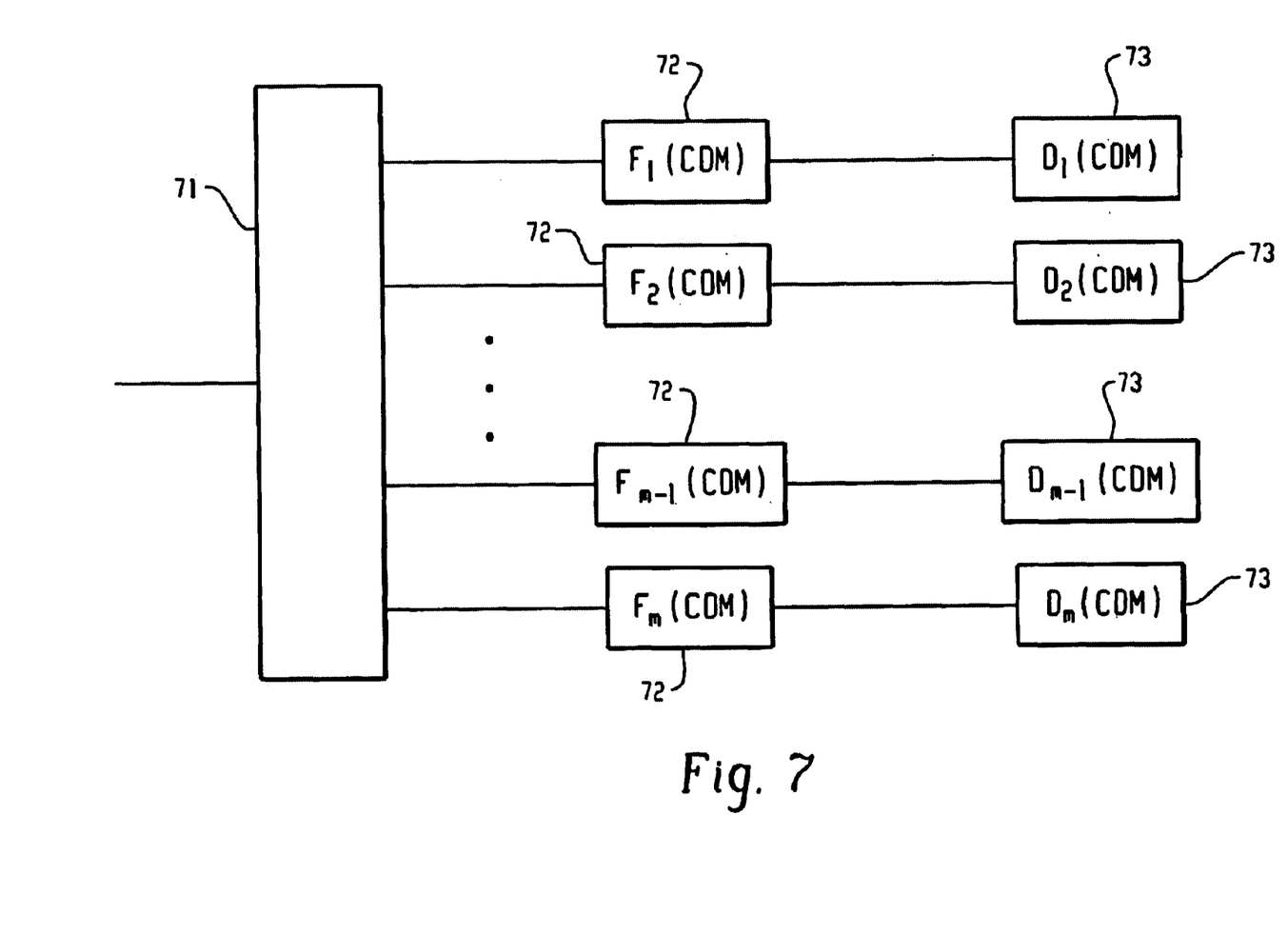
FIG. 7 is a block diagram of the CDM receiving unit of the multichannel communication system of the present invention.

For conventional WDM channel spectral band of ~1 nm, the fiber length difference is several centimeters. With the environmental temperature changing, this length causes significant phase drift between signal and reference arms of FIG. 2 and FIG. 7. For a length difference of 1 cm in fiber, the phase drift is 0.3 rad/° C. For lithium niobate, the phase drift is almost three times larger. For the CDM system to operate over a conventional temperature range (0–70)° C., passive or active stabilization of the phase drift is required. For passive stabilization, a temperature sensitive component is inserted in the optical delay line 25. This temperature sensitive component may be a metal tube or sheet attached to the segment of the optical delay line. The segment length $L_2$ is chosen to satisfy the equation $$L_1(\Delta\kappa/\kappa+\alpha_1)=L_2(1-p)\alpha_2$$

where $L_1$ is delay line length difference that has to be compensated, $\Delta\kappa/\kappa$ is relative change of refractive index $\kappa$ with temperature, $\alpha_1$ and $\alpha_2$ are thermal expansion coefficients of fiber and metal tube or sheet, and p is photoelastic coefficient of the fiber. If $L_2$ is exact, the phase drift between the signal and the reference paths is temperature independent. The procedure of passive stabilization is sequentially applied to all delay lines 25 of the CDM transmission unit.

The broadband optical source 21 of the present invention requires substantial noise reduction compared to broadband sources used in the conventional CDM systems. In the prior art CDM systems, the light source can be an EDFA, a light emitting diode, or a super-fluorescence laser diode having frequency bandwidth $\Delta v$ giving rise to a smooth, single-peaked correlation function with a coherent time $\tau_c \sim 1/\Delta v$, which relates to a coherent length $L_c$ by: $L_c = c\tau_c$, where c is speed of light. In the system of the present invention several CDM channels are transmitted through one WDM channel, and the spectral width of the CDM broadband optical source corresponds to the spectral width of one WDM channel, typically (50–100) GHz. The conventional light source used for CDM transmission within this spectral range is very noisy which makes high-speed data transmission impractical. The noise is originated from beating between different frequency components of the optical source after electrical detection. It is known [P. C. Becker, N. A. Olsson, J. R. Simpson, "Erbium-Doped Fiber Amplifiers, Fundamentals and Technology", Academic Press, San Diego, 1999] that the major noise component in broadband sources is relative intensity noise (RIN). RIN noise power is approximately inverse to the optical spectral width $\Delta\nu$, RIN~$1/\Delta\nu$. When optical source bandwidth $\Delta\nu$ confines from 4 THz (typical for conventional CDM systems) to 100 GHz of our preferred embodiment the associated noise penalty is about 20 dB.

To provide CDM unit performance compatible with the performance of WDM channels the system of the present invention utilizes a specially designed broadband source with substantially decreased RIN. This broadband optical source 21 may be implemented in two different embodiments. According to one embodiment shown in FIG. 3, the broadband optical source comprises a seed source 31, an optical filter 32 for selection of the spectral band within one WDM channel, two EDFAs 33, a semiconductor optical amplifier (SOA) 34, and an optical isolator 35 to prevent feedback from the optical link to the SOA. Some EDFAs may comprise isolators thus it may not be necessary to have isolators as separate source elements. In this embodiment of the broadband optical source, nonlinear properties and very short gain recovery time of the SOA is used for noise reduction. It was shown [S. Kim et. al., "Intensity Noise Suppression in Spectrum-Sliced Incoherent Light Communication Systems Using a Gain-Saturated Semiconductor Optical Amplifier", IEEE Photonics Tech. Lett., v. 11, p. 1042, 1999] that the gain-saturated SOA may compensate for fluctuations of electromagnetic field slower than gain recovery time which is less than 1 nsec. Thus, a gain-saturated SOA reduces detector noise at frequencies up to several GHz and allows 2.5 Gb/s data transmission within a spectral band of $\Delta\nu$~50 GHz.

Figure 3:
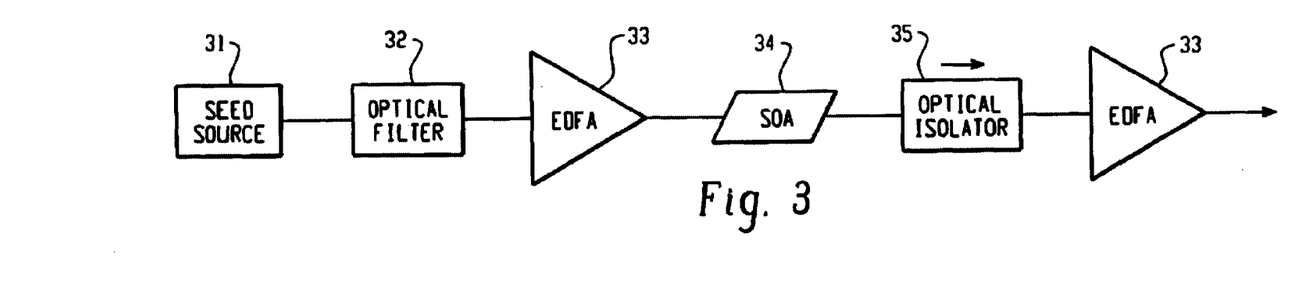
FIG. 3 is a block diagram of one embodiment of the CDM broadband optical source of the CDM transmission unit of continuous optical spectrum with reduced relative intensity noise (RIN).

The optical source of FIG. 3 though has very small intensity noise comparable to the noise of a single frequency laser, has the full RIN power transferred into phase noise. In the CDM system of the present invention, phase modulated data are transferred back into intensity modulated data at the receiver end. This process also transfers the phase noise into intensity noise. To employ the broadband light source of FIG. 3 for CDM transmission involving phase modulation, one has to optically filter out the light components carrying the phase noise.

Figure 4:
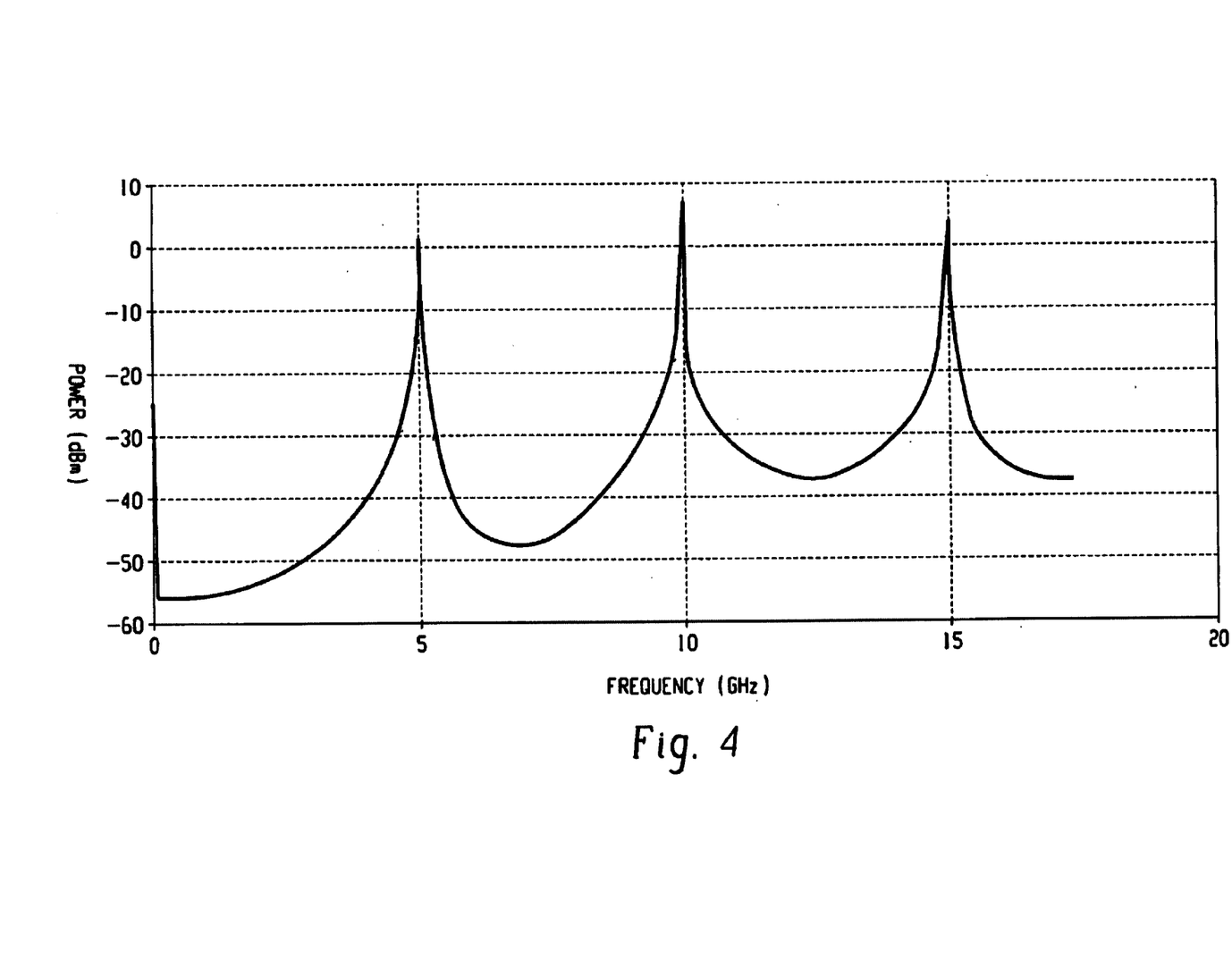
FIG. 4 is a graph showing electrical spectrum of relative intensity noise power of another embodiment of CDM optical source designed as a multimode laser with spectral separation between modes exceeding electrical bandwidth of each information channel.

According to another embodiment, the broadband optical source is implemented as a series of several discrete lasing modes separated by spectral gaps determined by transmitted data rate. The optical spectrum of this optical source is composed of discrete frequency components $\nu_0$, $\nu_0+f_0$, $\nu_0-f_0$, $\nu_0+2f_0$, $\nu_0-2f_0$, $\nu_0+f_0$, $\nu_0-3f_0$, . . . Spectral composition of RIN originated by the beating between different laser modes on the detector is presented in FIG. 4 by discrete frequency components at $f_0$, $2f_0$, $3f_0$ . . . If the frequency $f_0$ is chosen to exceed the signal spectral range, or electrical detection bandwidth, then the noise power at the detector caused by RIN is substantially reduced. In practice, receiver frequency response does not have sharp cut-off but falls gradually with frequency. Some noise will be detected through the tail of the frequency response. FIG. 4 shows that a proper choice of $f_0$ reduces the noise power on the detector by orders of magnitude compared to the conventional CDM light source.

Figures 5A, 5B, 5C:
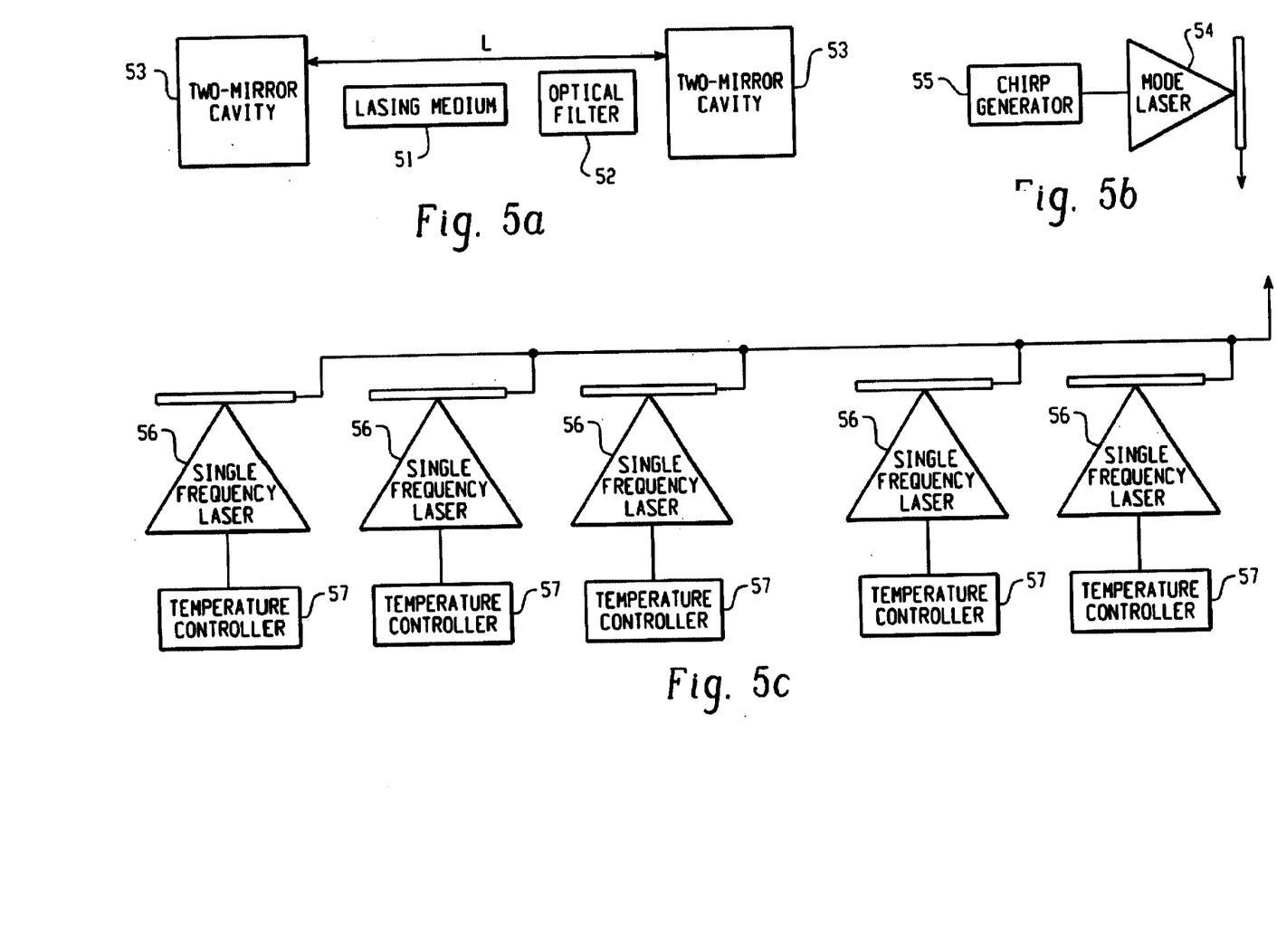
FIG. 5a illustrates one embodiment of multifrequency laser source with short laser cavity.
FIG. 5b illustrates another embodiment of multifrequency laser source with frequency chirped DFB laser.
FIG. 5c illustrates yet another embodiment of multifrequency laser source with plurality of DFB lasers tuned to the required frequency spectrum.
Figure 6:
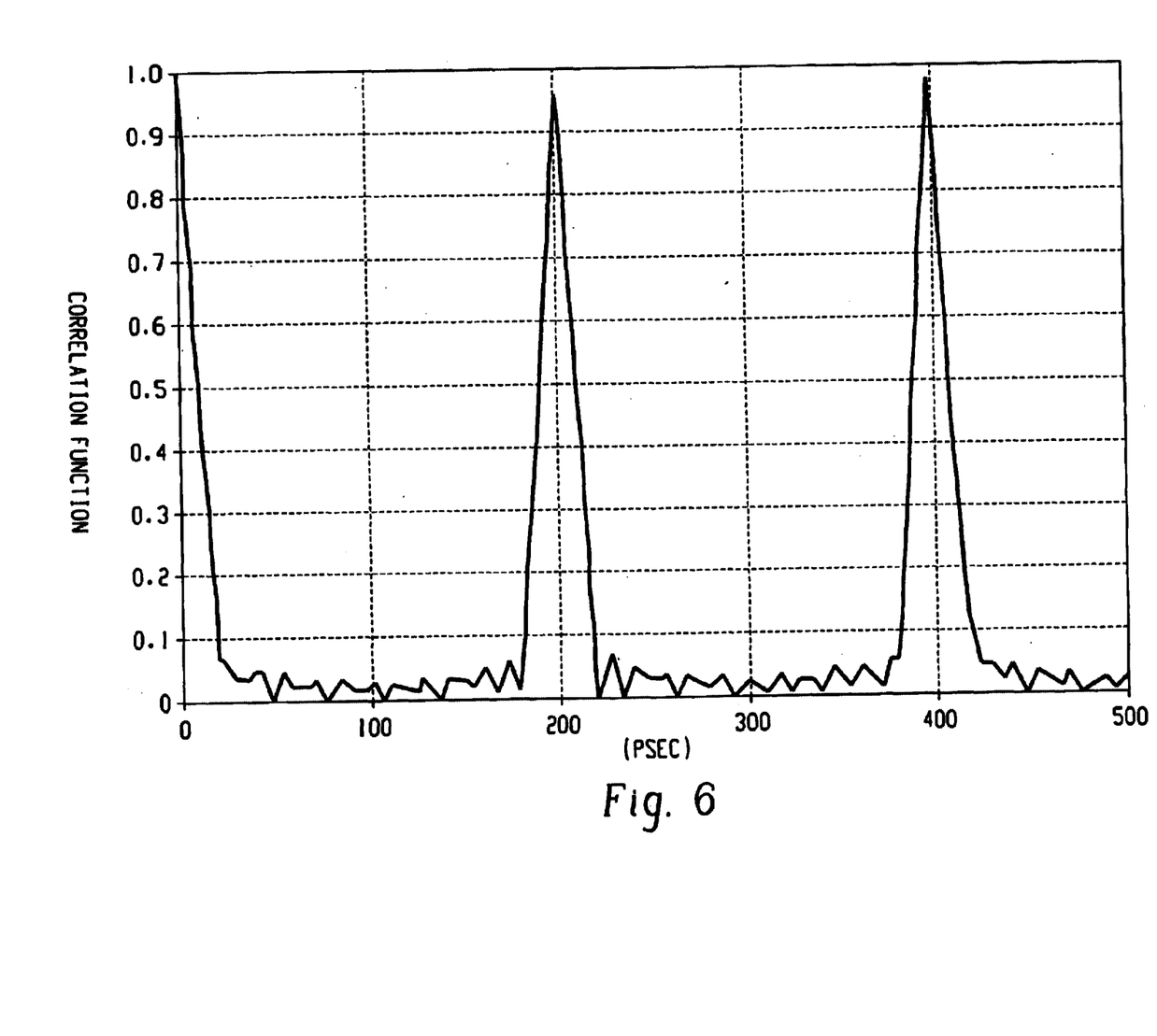
FIG. 6 is graph of periodic correlation function of multifrequency laser source.

FIGS. 5*a* through 5*c* show several implementations of the multifrequency laser light source. In FIG. 5*a*, a multimode laser is shown composed of a lasing medium 51, an optical filter 52 providing required center wavelength and bandwidth, and a two-mirror cavity 53 of optical length L that satisfies the condition $L=c/2f_0$. For $f_0=5$ GHz, $L=3$ cm. In FIG. 5*b*, a frequency chirped single mode laser 54 is shown, with the chirp applied periodically from a chirp generator 55 at frequency $f_0$. The amplitude of the modulation determines the bandwidth of the optical source. In FIG. 5*c*, a light source is shown composed of multiple single frequency lasers 56. The lasers are tuned by temperature controllers 57 and fixed at desired frequencies: $\nu_0$, $\nu_0+f_0$, $\nu_0-f_0$, $\nu_0+2f_0$, $\nu_0-2f_0$, $\nu_0+3f_0$, $\nu_0-3f_0$, . . . To produce the desired spectral shape the intensity of each laser is individually adjusted, or a proper optical filter is used. Contrary to the conventional broadband light source, the correlation function of the multifrequency laser source demonstrated in FIG. 6 is a periodical function of delay time $\tau$ that peaks at $\tau=0$, $1/f_0$, $2/f_0$ . . . , with each peak length in time $\tau_c$~$1/\Delta\nu$. Maximum capacity of CDM transmission unit of the present invention is defined by the number of CDM channels which may be inserted between two adjacent peaks of the correlation function with tolerable crosstalk.

FIG. 7 shows configuration of the CDM receiving unit. Light power dedicated for CDM transmission is demultiplexed by CDM demultiplexer 71. In each CDM receiving channel, phase delay introduced in the transmitting unit is compensated by optical filter 72, and CDM channels are detected by CDM detectors 73. Depending on the broadband optical source design, two respective receiver channel designs are implemented. For the optical source of FIG. 3 with continuous spectral density within one WDM channel and RIN suppression by SOA, optical filters 72 have to be used. In CDM transmission technology, the signal is always detected on the offset of incoherent background which causes, for many channels in CDM unit, significant noise power. This power carries, in the form of phase noise, the amplitude noise suppressed by saturated SOA which makes optical filter application necessary even for one CDM channel in WDM window. Optical filter design was disclosed in the patent application [I. M. Fishman, "Method and System for Optical Multichannel Transmission Using Coherence Division Multiplexing with Optical Filtering", U.S. patent application Ser. No. 09/063,758]. The optical filter suppresses mutually incoherent light components and noise caused by non-selected CDM optical channels and the incoherent components of the selected channel. To suppress the incoherent light, the optical filter acquires interference pattern for each CDM optical signal, and subtracts respective fields utilizing differential interferometry technique. With the optical filtering, phase noise is removed from the light detected by CDM detectors 73 which provides signal to noise ratio in CDM channels comparable to WDM channels.

For the multifrequency optical source of FIG. 5, optical filters 72 and CDM detectors 73 are implemented in a different fashion. With this source, RIN does not contribute to detector noise because RIN spectral density is shifted to frequencies exceeding the CDM channel electrical bandwidth (FIG. 4), and no differential interferometry optical filtering is required. In this embodiment, the optical filter is presented by an unbalanced Mach-Zehnder or Michelson interferometer restoring the phase delay caused by the CDM modulator delay lines 25 of FIG. 2. To suppress the incoherent component cause by non-selected CDM channels, the receiver 33 of FIG. 3 is implemented in a differential scheme with two identical photodetectors, placed at the two complimentary outputs of Mach-Zehnder or Michelson interferometer.

Although the preferred embodiment of the invention have been disclosed, additional advantages and modifications will readily occur to those skilled in the art. Therefore the invention in its broader terms is not limited to the specific details and representative devices, systems and elements shown and described herein. Various modifications can be made without departing from the spirit and scope of the general inventive concept as defined by the appended claims and their equivalents.

What is claimed is:

1. A multichannel optical communication system for transmitting optical signals via an optical fiber comprising:
   a plurality of individual WDM transmission channels;
   a CDM transmission unit disposed within at least one individual WDM transmission channel of said plurality, said CDM transmission unit comprising one or more CDM transmission channels;
   a number of individual WDM transmission channels of said plurality, each transmitting a WDM optical signal on a unique wavelength within a designated bandwidth; and
   said CDM transmission unit transmitting CDM optical signals within said designated bandwidth of said at least one individual WDM transmission channel
   a number of single frequency optical sources, each generating light within each individual WDM transmission channel transmitting said WDM optical signal, and a broadband optical source for generating light within said at least one WDM transmission channel transmitting said CDM optical signals;
   wherein said broadband optical source has a discrete spectrum with equally spaced individual spectral lines, a spectral spacing between said spectral lines exceeding an electrical detection bandwidth of transmitted CDM optical signals; and
   wherein said broadband optical source is a multimode laser comprising:
      a lasing medium;
      an optical filter for defining said designated bandwidth having a center wavelength at the center of said at least one individual WDM transmission channel; and
      an optical cavity having length $L=c/2f_0$ where c is the speed of light, $f_0$ is said spectral spacing between adjacent spectral modes of said broadband optical source.

2. The multichannel optical communication system of claim 1 further comprising:
   a WDM multiplexer for multiplexing optical outputs of said individual WDM transmission channels for transmitting said WDM optical signals and one or more CDM transmission channels for transmitting said CDM optical signals;
   at least one optical fiber link for transmitting said multiplexed optical outputs therethrough;
   a WDM demultiplexer for demultiplexing said optical outputs into said individual WDM transmission channels and one or more CDM transmission channels;
   a plurality of WDM receivers for receiving and detecting optical outputs from corresponding said WDM transmission channels; and
   one or more CDM receivers for receiving and detecting optical outputs from corresponding one or more said CDM transmission channels.

3. A multichannel optical fiber communication system for transmitting CDM optical signals via at least one WDM transmission channel comprising:
   a first plurality of individual WDM transmission channels for transmitting WDM optical signals and at least one individual WDM transmission channel for transmitting said CDM optical signals,
   each individual WDM transmission channel of said plurality comprising a single frequency optical source for generating light within said each WDM transmission channel for transmitting an optical signal on a unique wavelength within a designated range of wavelengths; and
   at least one coherence division multiplexed (CDM) transmission unit disposed within said at least one individual WDM transmission channel, said at least one CDM unit comprising:
      a second plurality of CDM transmission channels,
      a broadband optical source for generating light within said at least one WDM transmission channel for transmitting said CDM optical signals via said second plurality of CDM transmission channels,
      a light splitter for dividing said light generated by said broadband optical source into one reference path and a number of optical paths equal to a number of CDM transmission channels,
      each said CDM transmission channel comprising a phase modulator and an optical delay line interconnected therebetween, said optical delay line comprising a temperature sensitive component for stabilization of phase drift caused by environmental fluctuations;
   wherein said broadband source has a discrete spectrum with equally spaced individual spectral lines, a spectral spacing between said spectral lines exceeding an electrical detection of bandwidth of transmitted CDM optical signals; and
   wherein said optical delay lines provide time delays according to the relation: $t_1=mkt_c$, $t_2=(m+1)kt_c$ ..., $t_n=(2m-1)kt_c$, where m is the number of CDM transmission channels, $t_c$ is a coherence time of the broadband source, and k is a numerical factor.

4. The multichannel optical fiber communication system of claim 3, further comprising a wavelength division multiplexer for multiplexing WDM optical signals transmitted via said first plurality of WDM transmission channels and a coherence division multiplexer for multiplexing CDM optical signals transmitted via said second plurality of CDM transmission channels.

5. The multichannel optical fiber communication system of claim 4, further comprising at least one optical link, a wavelength division demultiplexer and a coherence division demultiplexer for routing said modulated WDM and CDM optical signals via said optical link to said wavelength division demultiplexer and coherence division demultiplexer respectively.

6. The multichannel optical fiber communication system of claim 5, further comprising:
   a first plurality of optical detectors for detecting demultiplexed WDM optical signals carried by said first plurality of WDM transmission channels; and
   a second plurality of optical detectors for detecting demultiplexed CDM optical signals carried by said second plurality of CDM transmission channels.

* * * * *